United States Patent
Heingärtner et al.

(10) Patent No.: US 6,553,803 B1
(45) Date of Patent: Apr. 29, 2003

(54) METHOD AND AN APPARATUS FOR DETERMINING THE BENDING ANGLE OF A WORK PIECE TO BE BENT

(75) Inventors: Jörg Heingärtner, Nenzing (AT); Jaroslav Houska, Niederrohrdorf (CH)

(73) Assignee: Bystronic Laser AG, Niederoenz (CH)

( * ) Notice: Subject to any disclaimer, the term of this patent is extended or adjusted under 35 U.S.C. 154(b) by 291 days.

(21) Appl. No.: 09/649,530

(22) Filed: Aug. 28, 2000

(30) Foreign Application Priority Data

Sep. 8, 1999 (CH) .............................................. 1630/99

(51) Int. Cl.[7] .............................. B21D 5/02; B21C 51/00
(52) U.S. Cl. ...................... 72/31.1; 72/389.3; 72/389.5; 72/702
(58) Field of Search ............................ 72/389.3, 389.5, 72/31.1, 702

(56) References Cited

U.S. PATENT DOCUMENTS

| | | | |
|---|---|---|---|
| 2,573,843 A | | 11/1951 | Hendrix et al. |
| 3,050,985 A | | 8/1962 | Roetter |
| 4,564,765 A | * | 1/1986 | Blaich ........................ 72/389.3 |
| 4,864,509 A | * | 9/1989 | Somerville et al. ......... 72/389.3 |
| 5,099,666 A | * | 3/1992 | Sartorio et al. ................ 72/702 |
| 5,148,693 A | | 9/1992 | Sartorio et al. |
| 5,367,902 A | * | 11/1994 | Kitabayashi et al. ........ 72/389.3 |
| 5,584,199 A | * | 12/1996 | Sartorio ....................... 72/389.3 |
| 5,839,310 A | * | 11/1998 | Tokai et al. .................. 72/31.1 |
| 6,098,435 A | * | 8/2000 | Takada ......................... 72/31.1 |

FOREIGN PATENT DOCUMENTS

FR 2654369 5/1991

* cited by examiner

*Primary Examiner*—David Jones
(74) *Attorney, Agent, or Firm*—Tarolli, Sundheim, Covell & Tummino L.L.P.

(57) ABSTRACT

The invention provides a method and an apparatus for determining the bending angle of a work piece to be bent by means of a bending apparatus comprising a punch member and a die member cooperating with the punch member. The die member is provided with at least two channels through which pressurized air is blown towards a leg of the bent work piece. For measuring the pressure in each of the channels, a plurality of pressure sensing devices is provided and connected to a common control and analyzing assembly. On the basis of the pressure values measured by the pressure sensing devices and with the aid of formulae, tables, three dimensional diagrams or with the aid of a neuronal network, the control and analyzing assembly calculates the bending angle.

28 Claims, 2 Drawing Sheets

METHOD AND AN APPARATUS FOR DETERMINING THE BENDING ANGLE OF A WORK PIECE TO BE BENT

BACKGROUND OF THE INVENTION

The present invention refers to a method for determining the bending angle of a work piece that is going to be or has been bent by means of a bending apparatus comprising a punch member and a die member cooperating with the punch member. Moreover, the present invention also refers to an apparatus for determining the bending angle of a work piece that is going to be or has been bent by means of a bending apparatus comprising a punch member and a die member cooperating with the punch member.

PRIOR ART

It is well known to any person skilled in the art that angular errors can occur in bending a work piece, e.g. a sheet metal work piece, these errors being caused by the non-theoretical behavior of the material. Thus, several distinct methods and apparatuses for measuring the actual bending angle are known in the art.

It is most common in the art to measure the bending angle by means of mechanically operating feelers or probes that are moved towards the bent work piece either from the bottom or from the top until they touch the surface of the work piece. Furthermore, optically operating measuring systems are known in the art that operate with reflected light, with transmitted light or with a laser beam.

Practically all measuring methods known in the art delimit the freedom of bending and the measurable geometry of the parts to a more or lesser degree. Usually, the measuring apparatuses are located in the bending area or are fed to the measuring point from the top of from the bottom. This disadvantage, as well as the fact that the measuring systems known in the art are not too accurate, results in the fact that readily available measuring systems are rarely used.

OBJECTS OF THE INVENTION

Thus, it is an object of the invention to provide a method for determining the bending angle of a work piece that is going to be or has been bent that is simple, universal and sturdy to use, yet yields very accurate results within a very short time. Moreover, it is a further object of the invention to provide an apparatus for determining the bending angle of a work piece that is going to be or has been bent that is of simple and sturdy design and that can be universally used, simultaneously being very fast and accurate in operation.

SUMMARY OF THE INVENTION

To achieve these and other objects, the present invention provides, according to a first aspect, a method for determining the bending angle of a work piece that is going to be or has been bent by means of a bending apparatus comprising a punch member and a die member cooperating with the punch member and having two bending edges. Once indirectly or directly operating detection members have been provided in at least two different locations on the die member, the detection members are operated to detect the position of at least one leg of the work piece to be bent with regard to the position of the die member and to output position data representing the detected position. Then, the bending angle is calculated in response to that position data and on the basis of previously stored reference data.

Due to the fact that the position of at least one leg of the work piece is determined relative to the position of the die member in at least two spaced apart locations, whereby the bending angle is calculated in response to these measured position data and on the basis of previously stored reference data, the actual bending angle can be determined very quickly and accurately, because, in this case, not the absolute measuring accuracy is important, but rather the reproducibility of the measuring method. As previously stored reference data, for instance measuring data can be used that have been recorded upon bending a reference work piece. Thereby, that reference work piece is bent continuously or step by step, and the measuring data allocated to a certain bending angle are recorded and stored, e.g. in the form of a table.

Preferably, the position of the leg of the work piece is measured both above and below the bending edge of the die member. Thereby, the measuring accuracy can be further increased, particularly in the case of very small or very big bending angles.

According to a second aspect, the present invention provides an apparatus for determining the bending angle of a work piece that is going to be or has been bent by means of a bending apparatus comprising a punch member and a die member cooperating with the punch member and having two bending edges.

The apparatus comprises detecting members for indirectly or directly detecting the position of at least one leg of the work piece relative to the die member and for outputting measurement signals. Means for generating position data on the basis of the measurement signals provided by the detecting members are provided. Further, the apparatus comprises a control and analyzing assembly for calculating the bending angle in response to the position data and on the basis of previously stored reference data, whereby detecting members for indirectly or directly detecting the position are located at different places of the die member.

BRIEF DESCRIPTION OF THE DRAWINGS

In the following, the method and the apparatus of the invention will be further described, with reference to the accompanying drawings, in which.

DETAILED DESCRIPTION OF THE PREFERRED EMBODIMENTS

Figure 1:
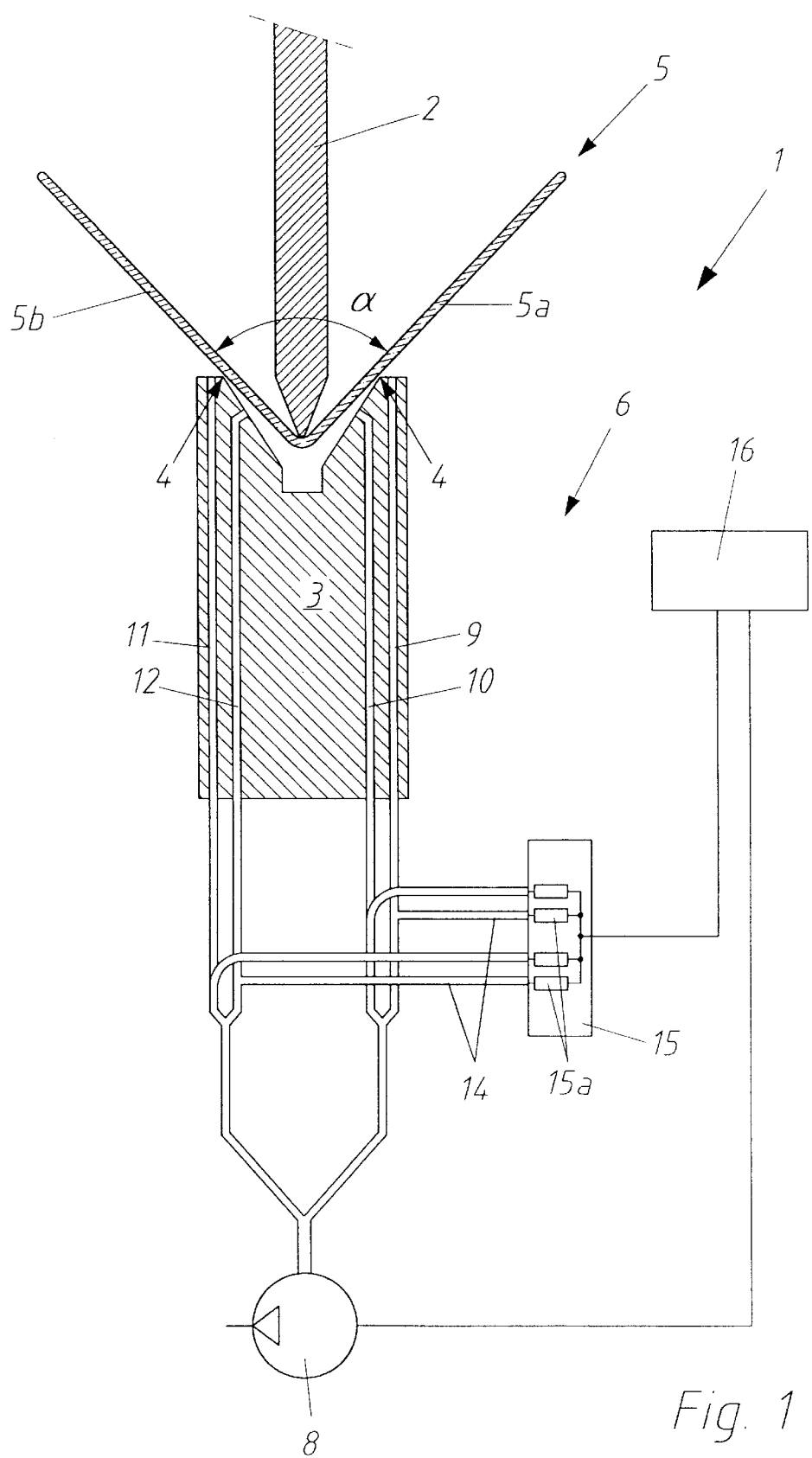
FIG. 1 shows a schematic partial sectional view of a first embodiment of an apparatus according to the invention.

FIG. 1 shows a schematic partial sectional view of a first embodiment of the apparatus according to the invention. After having explained the general design of that first embodiment of the apparatus, the method according to the invention will be further explained with reference to this apparatus.

The bending apparatus is generally designated with reference numeral 1. Since the design and construction, respectively, of a bending apparatus is well known to any person skilled in the art, and since the apparatus for measuring the bending angle according to the invention can be used with a bending apparatus of virtually whatsoever design and construction, respectively, only the punch member 2 and the die member 3 cooperating with the punch member 2 are shown in FIG. 1.

The die member 3 comprises an essentially V-shaped recess having two bending edges 4 located at its top surface. It is understood that the expression "bending edge" should not be interpreted as a sharp edge in the word's real sense, but rather a slightly rounded surface portion, as usually provided on die members known in the prior art. The work piece to be bent is designated by reference numeral 5. An apparatus for measuring the bending angle of a work piece 5 is generally designated with reference numeral 6.

The apparatus 6 comprises a pump 8 that is operationally connected to four channels 9, 10, 11 and 12 provided in the body of the die member 3. Each of the four channels 9, 10, 11 and 12 is provided with an outlet opening located in the region of the top of the die member 3. Air fed under pressure by the pump 8 is blown out through the four outlet openings towards the work piece 5. As can be clearly seen in FIG. 1, each of the channels 9, 10, 11 and 12 opens into the interior of the V-shaped recess such that the channel portions adjacent to the associated outlet openings run perpendicular to the inner surface of the V-shaped recess in each case. For measuring the pressures that are present in each of the four channels 9, 10, 11 and 12, a pressure-sensing device assembly 15 is provided that is connected to the channels 9, 10, 11 and 12 by means of conduits 14. Preferably, the pressure-sensing device assembly 15 comprises four individual pressure sensing devices 15a; in this way, the pressure present in each of the four channels 9, 10, 11 and 12 can be determined separately. For analyzing and evaluating the measured pressure data, a control and analyzing assembly 16 is provided.

The real bending operation and the determination of the bending angle is accomplished as follows:

The work piece 5 placed on the surface of the die member 3 is bent by moving the punch member 2 down into the recess provided in the die member 3 to such a degree that the angle between the two legs 5a, 5b of the work piece 5 corresponds as accurately as possible to the desired bending angle after the two legs have resiliently moved back. Thereby, attention has to be paid to the fact that, initially, the work piece 5 is not bent to an angle that is smaller than the desired bending angle.

During the bending operation, the bending angle is continuously measured. For this purpose, the control and analyzing assembly 16 activates the pump 8 with the result that air is blown out of the outlet openings of the channels 9, 10, 11 and 12. The four pressure-sensing devices 15a continuously determine the pressure present in each of the four channels 9, 10, 11 and 12 and transmit the measured data to the control and analyzing assembly 16. On the basis of these measured data and with the aid of formulae, tables, three dimensional diagrams or a neuronal network, the bending angle is calculated.

As soon as the punch 2 has reached the calculated or measured lowermost position, the pressure on the work piece 5 is released and the punch member 2 is moved upwards. During this releasing operation, the data delivered by the pressure-sensing devices 15a are analyzed as well. As soon as the data delivered by the pressure-sensing devices 15a do not change anymore and do not differ from a predetermined value by not more than a certain given amount per time unit, respectively, the releasing operation is stopped, because it can be assumed that the two legs 5a, 5b of the work piece 5 do not bounce back anymore. By stopping the retracting movement of the punch member 2, i.e. immediately when no alteration of the measured signals can be detected, the work piece 5 is kept in a centered position in the die member 3 by means of the punch member 2.

Now, the actual bending angle is determined by measuring the pressure present in the channels 9, 10, 11 and 12. On the basis of these pressure data, the actual bending angle can be calculated with the aid of formulae, tables, three dimensional diagrams or a neuronal network. Depending on the measured value of the bending angle, it is decided whether or not the bending operation has to be continued in order to bring the work piece 5 to the final shape. If the bending operation has to be continued, the measurement of the bending angle can be repeated as explained herein before as soon as that further bending is done.

Due to the fact, depending on the bending angle of the work piece 5, that the distance between the legs 5a, 5b of the work piece 5 and the outlet openings of the channels 9, 10, 11 and 12 varies, both the absolute as well as the differential pressure in the channels 9, 10, 11 and 12 fluctuate. On the basis of the determined pressure in each of the channels 9, 10, 11 and 12 and the measuring data retrieved therefrom, respectively, it is possible to conclude to the position of the legs 5a, 5b of the bent work piece 5 relative to the inner wall of the V-shaped recess in the die member 3. Thus, as previously already mentioned, the actual bending angle can be calculated with the aid of suitable formulae, three dimensional diagrams or tables. Another possibility consists in using a neuronal network for determining the bending angle.

If there is provided only one channel in the die member 3 associated with each of the legs 5a and 5b of the work piece 5, the absolute pressure in the channels must be used as a basis for calculating the actual bending angle. However, if four or even more channels 9, 10, 11 and 12 are provided, both the absolute as well as the differential pressures can be used as a basis for calculating the actual bending angle. According to the embodiment discussed herein before and shown in FIG. 1, and in contrast to the second embodiment to be discussed herein after, in which probe members are provided for measuring the distance and the position, respectively, of a leg 5a, 5b, the positions of the legs 5a and 5b can be determined only in an indirect way, i.e. in response to the pressures in the channels 9, 10, 11 and 12 measured by means of the pressure-sensing devices 15a.

As can be seen in FIG. 1, the channels 9 and 11 have outlet openings located above or outside the bending edges 4, while the outlet openings of the channels 10 and 12 are located in the interior of the recess provided in the die member 3, i.e. below the bending edges 4. Thereby, it must be considered in calculating the actual bending angle that the relation between distance of the leg 5a and 5b, respectively, from the outlet openings of the channels 9 and 11, respectively, is different from the relation between distance of the leg 5a and 5b, respectively, from the outlet openings of the channels 10 and 12, respectively.

If long work pieces have to be bent, it can be advantageous to provide a plurality of sets of outlet openings along the longitudinal extension of the work piece 5, i.e. along the bending line, such that the bending angle can be determined at several locations and the bending tolerance along the longitudinal extension of the work piece 5 can be measured.

Figure 2:
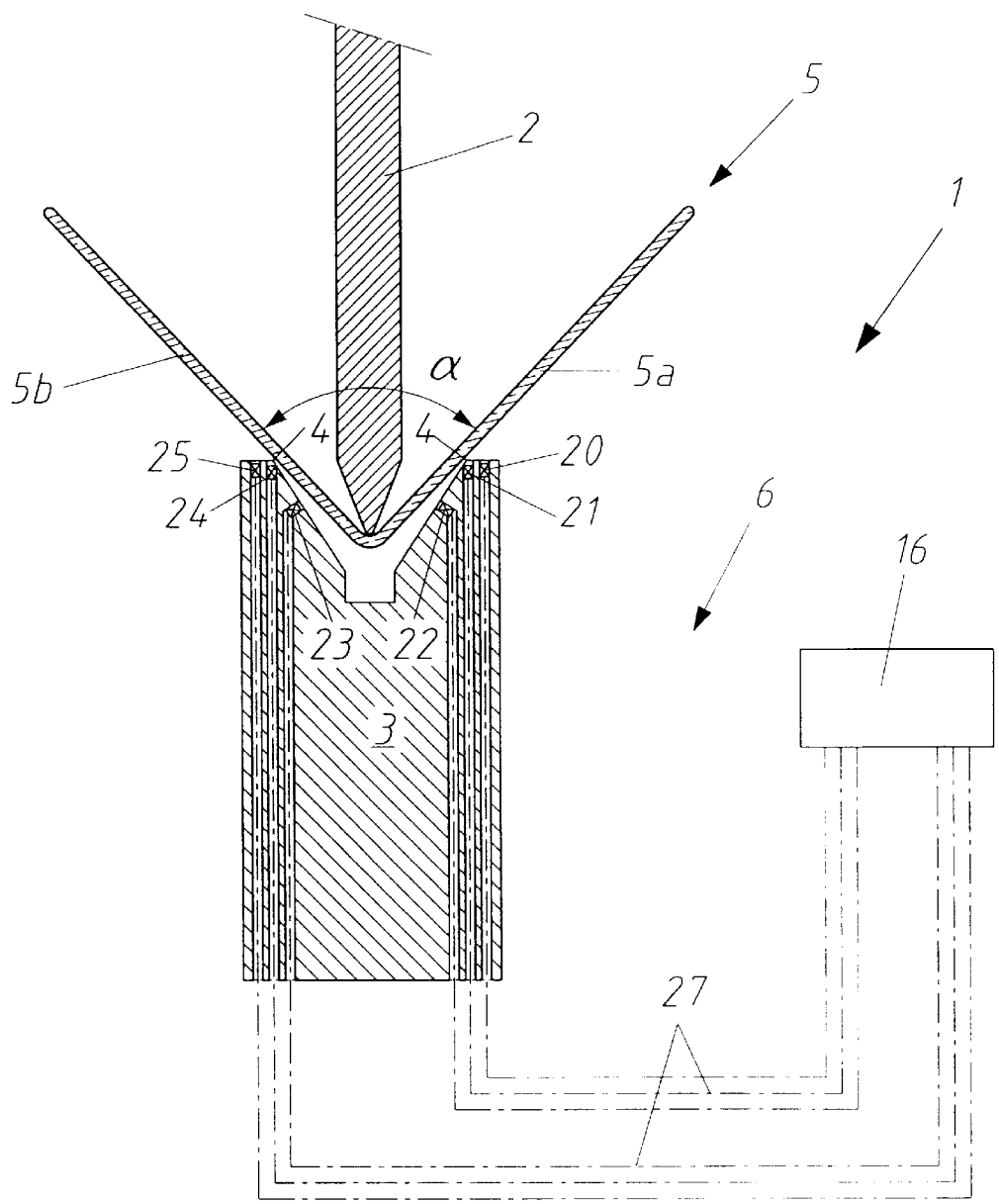
FIG. 2 shows a schematic partial sectional view of a second embodiment of an apparatus according to the invention.

FIG. 2 shows a schematic partial sectional view of a second embodiment of an apparatus according to the invention. In lieu of the channels 9, 10, 11 and 12 for feeding pressurized air as shown in FIG. 1, the second embodiment is provided, in that particular example, with six probe members 20, 21, 22, 23, 24 and 25. These probe members are shown but schematically in FIG. 2. For example, capacitive, inductive, optical or ultrasonic probe members 20, 21, 22, 23, 24 and 25 can be provided. In the present example, three probe members 20, 21, 22 are allocated to the leg 5a of the work piece 5 to be bent, and three probe members 23, 24, 25 are allocated to the leg 5b of the work piece 5 to be bent. Thereby, the probe members 22 and 23 are located below the bending edges 4, the probe members 21 and 24 are located in the region of the bending edges 4, and the probe members 20 and 25 are located above the bending edges 4 of the die member 3. The probe members 20, 21, 22, 23, 24 and 25 are connected to the control and analyzing assembly 16 by means of schematically shown leads 27. In this case as well, both the individual data delivered by the probe members 20, 21, 22, 23, 24 and 25 as well as the differential data can be used for calculating the actual bending angle. The bending operation per se can be accomplished in the same manner as described in connection with the first embodiment according to FIG. 1, whereby, also in the case of the second embodiment, formulae, tables, three dimensional diagrams or a neuronal network are used for determining the actual bending angle.

The apparatus 6 for measuring the bending angle of a work piece 5 is of a relatively simple design and limits neither the bending operation nor the permissible geometry of the parts. The apparatus 6 as well as the method according to the invention can be universally used and are insensitive to use. Moreover, the actual bending angle can be determined very accurately and quickly.

It is understood that the invention is not limited to the two embodiments described herein above; rather, numerous other embodiments of the apparatus according to the invention can be realized as long as they are within the scope of the appended claims.

What is claimed is:

1. A method for determining the bending angle of a work piece that is going to be or has been bent by means of a bending apparatus comprising a punch means and a die means cooperating with said punch means and having two unbending edge means, the method comprising the steps of:

providing indirectly operating detection means in at least two different locations on said die means;

operating said detection means to detect the position of at least one leg of the work piece to be bent with regard to the position of said die means and to output position data representing the detected position; and calculating the bending angle in response to said position data and on the basis of the previously stored reference data, the position of said at least one leg of the work piece to be bent being detected both above and below said bending edge means of said die means.

2. The method according to claim 1 in which the position of said at least one leg of the work piece to be bent is detected in the region of said bending edge means of said die means.

3. The method according to claim 1 in which said detection means is operated to detect the position of both legs of the work piece to be bent with regard to the position of said die means and to output position data representing the detected positions.

4. The method according to claim 1 in which said step of operating said indirectly operating detection means comprises the steps of:

providing at least two channel means in said die means, said channel means having outlet opening means facing said leg of said work piece to be bent;

feeding air into said channel means and blowing said air through said outlet opening means towards a leg of said work piece: and measuring the pressure in each of said channel means;

the value of said measured pressure representing said position data required to calculate the bending angle.

5. The method according to claim 4 in which at least one of said legs of said work piece is subjected to said flow of air blown through said channels provided in said die means.

6. The method according to claim 1 in which the absolute pressure is measured in said channel means provided in said die means, whereby the bending angle is calculated in response to said measured absolute pressure values and on the basis of formulae, tables, three dimensional diagrams or by means of a neuronal network.

7. The method according to claim 1 in which the pressure is measured in said channel means provided in said die means and a differential pressure value is calculated, whereby the bending angle is calculated in response to said differential pressure value and on the basis of formulae, tables, three dimensional diagrams or by means of a neuronal network.

8. The method according to claim 1 in which both of said legs of said work piece are subjected to said flow of air blown through at least two channels per leg provided in said die means, whereby each of said legs is subjected to said air flow both above and below said bending edge means of said die means, and whereby the differential pressure of two of said channel means associated to one of said legs is used for calculating the bending angle.

9. The method of claim 1 in which the bending angle is determined at a plurality of locations distributed along the longitudinal extension of the work piece.

10. A method for determining the bending angle of a work piece that is going to be or has been bent by means of a bending apparatus comprising a punch means and a die means cooperating with said punch means and having two bending edge means, the method comprising the steps of:

providing directly operating detection means in at least two different locations on said die means;

operating said detection means to detect the position of at least one leg of the work piece to be bent with regard to the position of said die means and to output position data representing the detected position; and calculating the bending angle in response to said position data and on the basis of previously stored reference data, the position of said at least one leg of the work piece to be bent being detected both above and below said bending edge means of said die means.

11. The method according to claim 10 in which the position of said at least one leg of the work piece to be bent is detected in the region of said bending edge means of said die means.

12. The method according to claim 10 in which said detection means is operated to detect the position of both legs of the work piece to be bent with regard to the position of said die means and to output position data representing the detected positions.

13. The method according to claim 10 in which said step of operating said directly operating detection means comprises the steps of detecting the position of at least one leg means of said work piece capacitively, inductively, optically or by means of ultrasonic waves.

14. The method according to claim 10 in which said step of operating said directly operating detection means comprises the steps of:

providing at least two probe member means in said die means; and detecting the position of at least one of said leg means of said work piece by means of said probe member means.

15. The method according to claim 10 in which the absolute position value is outputted as said position data, whereby the bending angle is calculated in response to said measured absolute position values and on the basis of formulae, tables, three dimensional diagrams or by means of a neuronal network.

16. The method according to claim 10 in which a differential position value is calculated, whereby the bending angle is calculated in response to said differential position value and on the basis of formulae, tables, three dimensional diagrams or by means of a neuronal network.

17. The method according to claim 10 in which the positions of both of said legs of said work piece are detected with the aid of said probe member means, whereby the positions of each of said legs is detected both above and below said bending edge means of said die means, and whereby the differential value of two of said probe member means associated to one of said legs is used for calculating the bending angle.

18. An apparatus for determining the bending angle of a work piece that is going to be or has been bent by means of a bending apparatus comprising a punch means and a die means cooperating with said punch means and having two bending edge means, said apparatus for determining the bending angle comprising:
 means for indirectly detecting the position of at least one leg means of said work piece relative to said die means and for outputting measurement signals;
 means for generating position data on the basis of the measurement signals provided by said detecting means; and
 a control and analyzing means for calculating the bending angle in response to said position data and on the basis of previously store reference data;
 at least one of said means for indirectly detecting the position being located above at least one of said bending edge means of said die means, at least one other of said means for indirectly detecting the position being located below at least one of said bending edge means of said die means.

19. The apparatus according to claim 18 in which said means for indirectly detecting the position comprise:
 at least two channel means provided in said die means, each of said channel means being provided with an outlet opening means located in the region of the top of said die means;
 a means for feeding pressurized air to said channel means; and
 pressure sensing means operationally connected to said channel means for measuring the pressure in said channel means.

20. The apparatus according to claim 19 in which said at least two channel means are located on one side of said die means and allocated to one of said leg means of said work piece, whereby said outlet opening means of at least one of said channel means is located above said bending edge means of said die means, and said outlet opening means of at least another one of said channel means is located below said bending edge means of said die means.

21. The apparatus according to claim 19 in which at least three channel means are located on one side of said die means and allocated to one of said leg means of said work piece, whereby said outlet opening means of at least one of said channel means is located above said bending edge means of said die means, and said outlet opening means of at least another one of said channel means is located below said bending edge means of said die means, and whereby one of said opening means is located in the region of said bending edge means of said die means.

22. The apparatus according to claim 19 in which there are provided at least four of said channel means, at least two of said channel means being allocated to one of said leg means of the work piece and at least another two of said channel means being allocated to the other one of said leg means of the work piece.

23. The apparatus according to claim 18 in which said means for directly detecting the position of at least one leg of said work piece comprise capacitively operating probe means, inductively operating probe means, optically operating probe means or probe means operating with the aid of ultrasound.

24. The apparatus according to claim 18 in which said control and analyzing means comprises storage means for managing formulae, tables or three dimensional diagrams.

25. The apparatus according to claim 18 in which said control and analyzing means comprises a neuronal network.

26. An apparatus for determining the bending angle of a work piece that is going to be or has been bent by means of a bending apparatus comprising a punch means and a die means cooperating with said punch means and having two bending edge means, said apparatus for determining the bending angle comprising:
 means for directly detecting the position of at least one leg means of said work piece relative to said die means and for outputting measurement signals;
 means for generating position data on the basis of the measurement signals provided by detecting means; and
 a control and analyzing means for calculating the bending angle in response to said position data and on the basis of previously store reference data;
 at least one of said means for directly detecting the position being located above at least one of said bending edge means of said die means, at least one other of said means for directly detecting the position being located below at least one of said bending edge means of said die means.

27. The apparatus according to claim 26 in which said means for directly detecting the position comprise at least two probe means incorporated in said die means and allocated to one of said leg means of said work piece, at least one of said probe means being located above said bending edge means and at least another one of said probe means being located below said bending edge means.

28. The apparatus according to claim 26 in which said means for directly detecting the position comprise at least three probe means incorporated in said die means and allocated to one of said leg means of said work piece, at least one of said probe means being located above said bending edge means, at least another one of said probe means being located below said bending edge means and at least another one of said probe means being located in the region of said bending edge means of said die means.

* * * * *